(12) United States Patent
Nishide et al.

(10) Patent No.: US 6,293,382 B1
(45) Date of Patent: Sep. 25, 2001

(54) FRICTION PLATE FOR WET CLUTCH

(75) Inventors: Yukio Nishide; Mitsuo Miyatsu; Chiwaji Suzuki; Jyun Tokumasu, all of Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 09/556,314

(22) Filed: Apr. 24, 2000

(30) Foreign Application Priority Data

Feb. 4, 2000 (JP) .................................................. 12-032805

(51) Int. Cl.⁷ ............................. F16D 13/64; F16D 13/74
(52) U.S. Cl. .................................. 192/107 R; 192/113.36
(58) Field of Search .............................. 192/70.12, 70.14, 192/107 R, 113.36; 188/218 XL, 264 E

(56) References Cited

U.S. PATENT DOCUMENTS

| | | | |
|---|---|---|---|
| 5,101,953 | * | 4/1992 | Payvar ............................. 192/107 R |
| 5,176,236 | * | 1/1993 | Ghidorzi et al. ................. 192/107 R |
| 5,682,971 | * | 11/1997 | Takakura et al. ................ 192/107 R |

FOREIGN PATENT DOCUMENTS

| | | |
|---|---|---|
| 4-211729 | 8/1992 | (JP) . |
| 11-336805 | * 12/1999 | (JP) . |

* cited by examiner

*Primary Examiner*—Richard M. Lorence
(74) *Attorney, Agent, or Firm*—Arent Fox Kintner Plotkin & Kahn, PLLC

(57) ABSTRACT

A friction plate for a wet clutch includes a core plate, and friction members bonded to opposite sides of the plate core. The friction member is provided with a plurality of first oil grooves each permitting the communication between inner and outer circumferential edges of the friction member, and a plurality of second oil grooves each permitting the communication between intermediate portions of the adjacent first oil grooves. The first oil grooves are disposed in such a manner that they are inclined at a given angle in a circumferential direction of the core plate with respect to a line of radius passing through a radially inner end of each first oil groove. The second oil grooves are disposed in such a manner that they are inclined in the same direction as the first oil grooves at an acute angle larger than the given angle with respect to a line of radius passing through a radially inner end of each second oil groove. Thus, the cooling property is enhanced, and the dragging torque is decreased.

7 Claims, 7 Drawing Sheets

FLOW OF OIL

FLOW OF OIL

FRICTION PLATE FOR WET CLUTCH

BACKGROUND OF THE INVENTION

1. Field of the Invention

The present invention relates to a friction plate for a wet clutch, and particularly, to an improvement in a friction plate for a wet clutch, which is comprised of a core plate, and friction members bonded to opposite sides of the core plate, the friction members being provided with a plurality of first oil grooves permitting the communication between inner and outer circumferential edges of the friction member, and a plurality of second oil grooves each permitting the communications between intermediate portions of adjacent first oil grooves, each of the first oil grooves being disposed in such a manner that it is inclined in a circumferential direction of the core plate at a given angle with respect to a line of radius passing through a radially inner end of the first oil groove.

2. Description of the Related Art

Such a friction plate for a wet clutch is already known, as disclosed, f or example, in Japanese Patent Application Laid-open No. 4-211729, and an essential portion of such friction plate is shown in FIG. 8. In FIG. 8, reference numeral 020 is a plate core; 021 is a friction member; 022 is a first oil groove; and 023 is a second groove.

In use of such friction plate for the wet clutch, when the clutch is turned off, cooling oil, during passing through the first oil groove, is diverted into the second oil groove, thereby cooling all the friction members, and preventing the dragging that may cause due to the viscosity of the oil.

However, the second oil grooves 023 in the conventional friction plate are arranged on the same circumference concentric with the core plate 020, as shown in FIG. 8. Therefore, when the friction plate and its adjacent clutch plate are rotated relative to each other by turning off the clutch, a pumping effect for positively feeding the oil in a radial direction is not generated in the second oil grooves 023, and it is difficult to permit a large amount of oil to be passed, particularly, through the second oil grooves.

SUMMARY OF THE INVENTION

Accordingly, it is an object of the present invention to provide a friction plate of the above-described type for a wet clutch, which is designed so that when the friction plate and its adjacent clutch plate are rotated relative to each other by turning off the clutch, a pumping effect is generated even in second oil grooves, whereby a large amount of oil can be passed through the second oil grooves, leading to a high cooling property and a low dragging torque.

To achieve the above object, according to the present invention, there is provided a friction plate for a wet clutch, comprising a core plate, and friction members bonded to opposite sides of the core plate, the friction members being provided with a plurality of first Oil grooves each permitting the communication between inner and outer circumferential edges of the friction member, and a plurality of second oil grooves each permitting the communication between intermediate portions of the adjacent first oil grooves, the first oil grooves being disposed in such a manner that they are inclined at a given angle in a circumferential direction of the core plate with respect to a line of radius passing through a radially inner end of each first oil groove, wherein the second oil grooves are disposed in such a manner that they are inclined in the same direction as the first oil grooves at an acute angle larger than the given angle with respect to a line of radius passing through a radially inner end of each second oil groove.

With the above arrangement, when the clutch is turned off, both of the first and second oil grooves in the friction member exhibit a screw pumping effect by the relative rotation of the friction plate and its adjacent clutch plate, thereby scraping the oil off between the friction plate and the clutch plate to transfer the oil to the inner or outer circumference side of the friction plate. Thus, a large amount of oil supplied to the clutch is permitted to flow through the first and second oil grooves. As a result, the dragging torque due to the viscosity of oil between the friction plate and the clutch plate is decreased remarkably, and the entire friction member can be cooled effectively.

According to the present invention, in addition to the above feature, the first oil grooves are formed rectilinearly from an inner circumferential edge to an outer circumferential edge of the friction member.

With this feature, the first oil grooves extending rectilinearly from the inner circumferential edge to the outer circumferential edge of the friction member are small in flow path resistance, and a pumping effect of the second oil grooves is applied to the first oil grooves. Thus, the flow rate of the oil passed through the first oil grooves can be increased, thereby further decreasing the dragging torque and cooling the friction member.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of embodiments with reference to the accompanying drawings.

Figure 1:
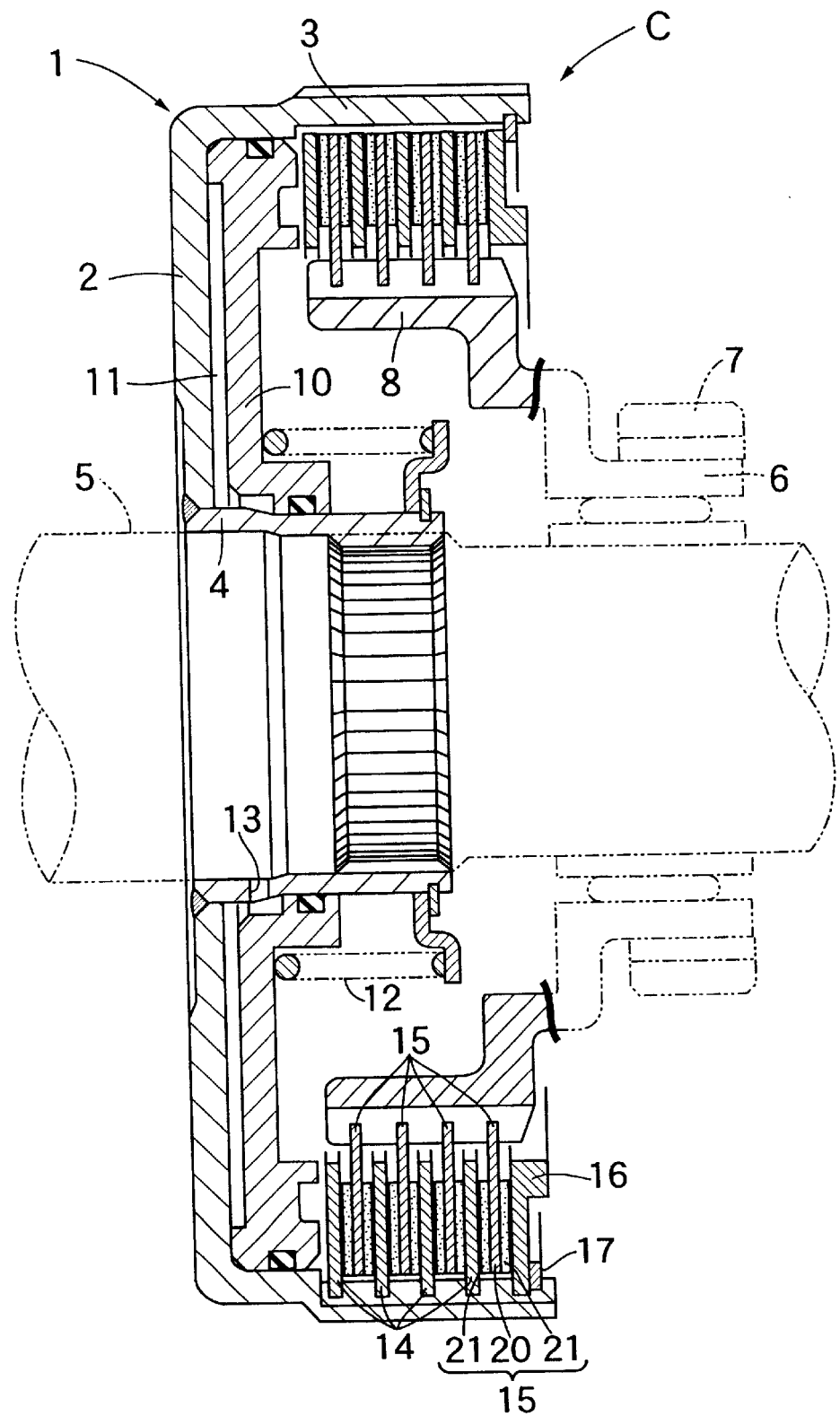
FIG. 1 is a vertical sectional view of a wet clutch provided with friction plates according to a first embodiment of the present invent.

First, a first embodiment of the present invention will be described with reference to FIGS. 1 to 2B.

Reference character C designates a wet clutch for an automatic transmission of an automobile. The clutch includes a clutch housing 1 which is comprised of a cylindrical portion 3 connected to an outer circumferential end of an end wall 2, and a boss 4 connected to an inner circumferential end of the end wall 2. The boss 4 is spline-coupled to an input shaft 5. An output shaft 6 integrally provided with a driving gear 7 is relatively rotatably carried on the input shaft 5, and a clutch inner 8 integrally connected to the output shaft 6 is concentrically disposed within the cylindrical portion 3.

A pressing piston 10 is slidably received on an inner circumferential surface of the cylindrical portion 3 and an outer circumferential surface of the boss 4 to define a hydraulic pressure chamber 11 between the piston 10 and the end wall 2. A return spring 12 is mounted under compression between the pressing piston 10 and the boss 4 for biasing the pressing piston 10 toward the hydraulic pressure chamber 11. The boss 4 is provided with a working oil supply and discharge bore 13 which is connected to the hydraulic pressure chamber 11.

A plurality of clutch plates 14 made of a metal are slidably spline-fitted in the inner circumferential surface of the cylindrical portion 3 adjacent the outside of the pressing piston 10, and a plurality of friction plates 15 according to the present invention and disposed to become superposed alternately with the clutch plates 14 are slidably spline-fitted in the outer circumferential surface of the clutch inner 8. Further, a pressure-receiving plate 16 opposed to an outer surface of the outermost friction plate 15 is spline-fitted in the cylindrical portion 3, so that the axially outward movement thereof is inhibited by a retaining ring 17 locked to the cylindrical portion 3.

A cooling oil is supplied from the inside or the outside to the clutch C during operation by an oil supply means which is not shown.

The friction plate 15 according to the present invention will now be described with reference to FIGS. 1 to 2B.

The friction plate 15 is comprised of a core plate 20 made of a metal, and friction members 21 bonded to one side 20a and the other side 20b of the plate core 20 by an adhesive or the like.

In the following description, the term "rotational direction a or b of the friction plate 15" means a direction of rotation of the friction plate 15 relative to the clutch plate 14.

Figure 2A:
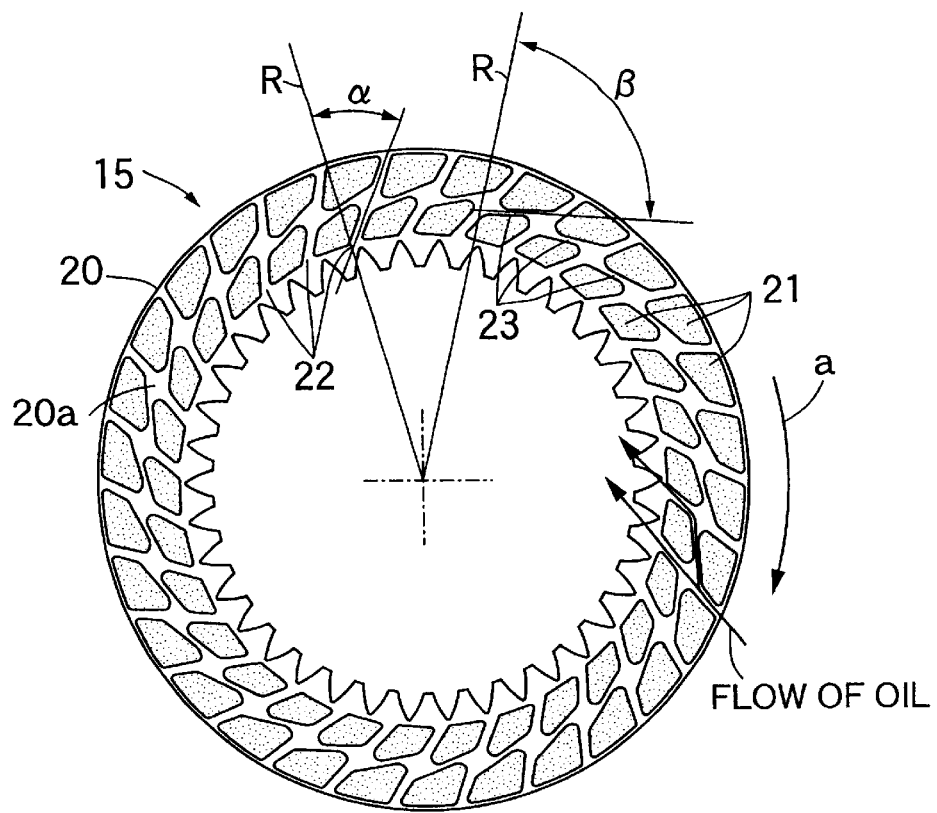
FIG. 2A is a view of one side of the friction plate shown in FIG. 1.
Figure 2B:
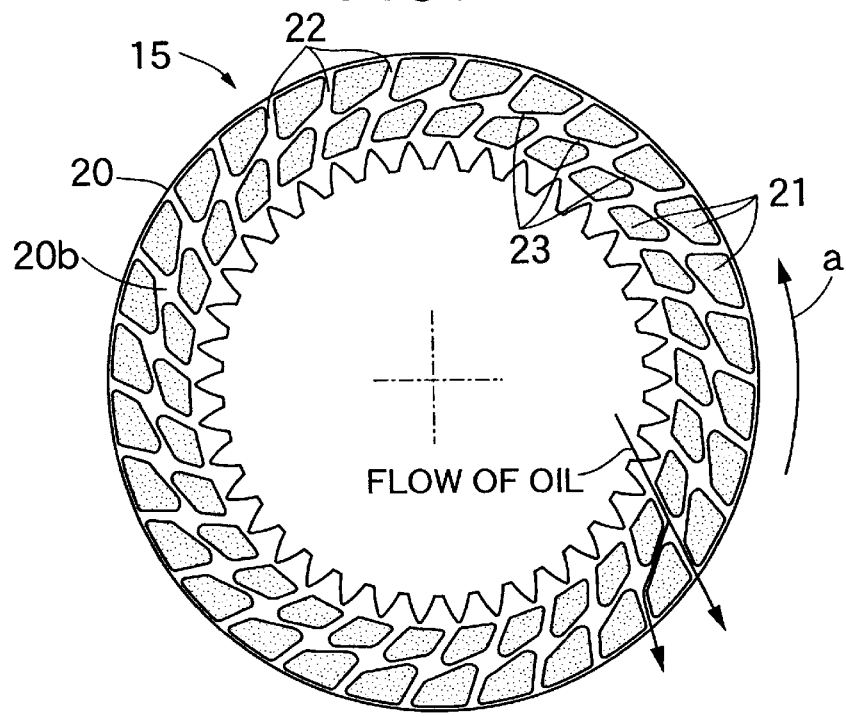
FIG. 2B is a view of the other side of the friction plate.

As shown in FIGS. 2A and 2B, each of the friction members 21 is provided with a large number of first cooling oil grooves 22 which rectilinearly interconnect inner and outer circumferential edges of the friction member 21, and a large number of second oil grooves 23 each permitting the communication between intermediate portions of the adjacent first oil grooves 22. Each of the first oil grooves 22 is disposed in such a manner that it is inclined in a circumferential direction of the core plate 20 at a given angle α with respect to a line R of radius of the core plate 20 passing through a radially inner end of the first oil groove 22. Each of the second oil grooves 23 is disposed in such a manner that it is inclined in the same direction as the first oil groove 22 at an acute angle β larger than the given angle α with respect to a line R of radius passing through an radially inner end of the second oil groove 23. In this case, the first and second oil grooves 22 and 23 in the friction members 21 on the one side 20a of the core plate 20 are disposed, so that their radially outer ends open in a rotational direction a of the friction plate 15, as shown in FIG. 2A, and the first and second oil grooves 22 and 23 in the friction members 21 on the other side 20b of the core plate 20 are disposed, so that their radially outer ends open in a direction opposite from the rotational direction a of the friction plate 15, as shown in FIG. 2B.

The pluralities of first and second oil grooves 22 and 23 are disposed at equal distances in the circumferential direction of the core plate 20.

The operation of the first embodiment will be described below.

If a working hydraulic pressure is supplied to the hydraulic pressure chamber 11 in the clutch C, the pressing piston 10 receiving the hydraulic pressure is advanced against a load of the return spring 12, i.e., slid toward the groups of friction plates 15 and clutch plates 14 to clamp the friction plates 15 and the clutch plates 14 between the piston 10 and the pressure receiving plate 16. Thus, the friction plates 15 and the clutch plates 14 are brought into friction engagement with each other. The clutch C which has been brought into a clutch-ON state enables a power to be transmitted from the input shaft 5 to the output shaft 6. If the hydraulic pressure is released from the hydraulic pressure chamber 11, the pressing piston 10 is retracted by the load of the return spring 12. Therefore, the friction plates 15 and the clutch plate 14 are brought into their free states, and the clutch C is brought into a clutch-OFF state in which it cuts off the transmission of the power between the input shaft 5 and the output shaft 6.

In this clutch-OFF state, a relative rotation is produced between the friction plates 15 and the clutch plates 14 by the relative rotation between the input shaft 5 and the output shaft 6. At this time, if the friction plates 15 are rotated in a direction of an arrow a relative to the clutch plates 14, the first and second oil grooves 22 and 23 in each of the friction members 21 exhibit a screw pumping effect by cooperation with the adjacent clutch plate 14 to scrape off the oil existing between the friction member 21 and the adjacent clutch plate 14, thereby forcing-in the oil toward the inner periphery of the friction member 21, as shown by the arrow a in FIG. 2A, on the one hand, and forcing-out the oil toward the outer periphery of the friction member 21, as shown by the arrow a in FIG. 2B, on the other hand. This is because both of the first and second oil grooves 22 and 23 in each of the friction members 21 are disposed in such a manner that they are inclined in the circumferential direction of the friction plate 15 with respect to the line R of radius passing through their inner ends. Under such pumping effect, the oil supplied to the clutch C is allowed to flow in a large amount through the first and second oil grooves 22 and 23 from the outer periphery side to the inner periphery side of the friction member 21 or from the inner periphery side to the outer periphery side of the friction member 21. As a result, a dragging torque generated due to the viscosity of the oil between the friction plate 15 and the clutch plate 14 is decreased remarkably, and all the friction members 21 can be cooled effectively.

Particularly, the first oil grooves 22 extend rectilinearly from the inner circumferential edge to the outer circumferential edge of the friction member 21, leading to a small flow path resistance, and the pumping effect of the second oil grooves 23 is applied to the first oil grooves 22. This ensures that the flow rate of the oil passed through the first oil grooves 22 is increased, and the decrease in dragging torque and the cooling of the friction members 21 can be further promoted.

Figure 7:
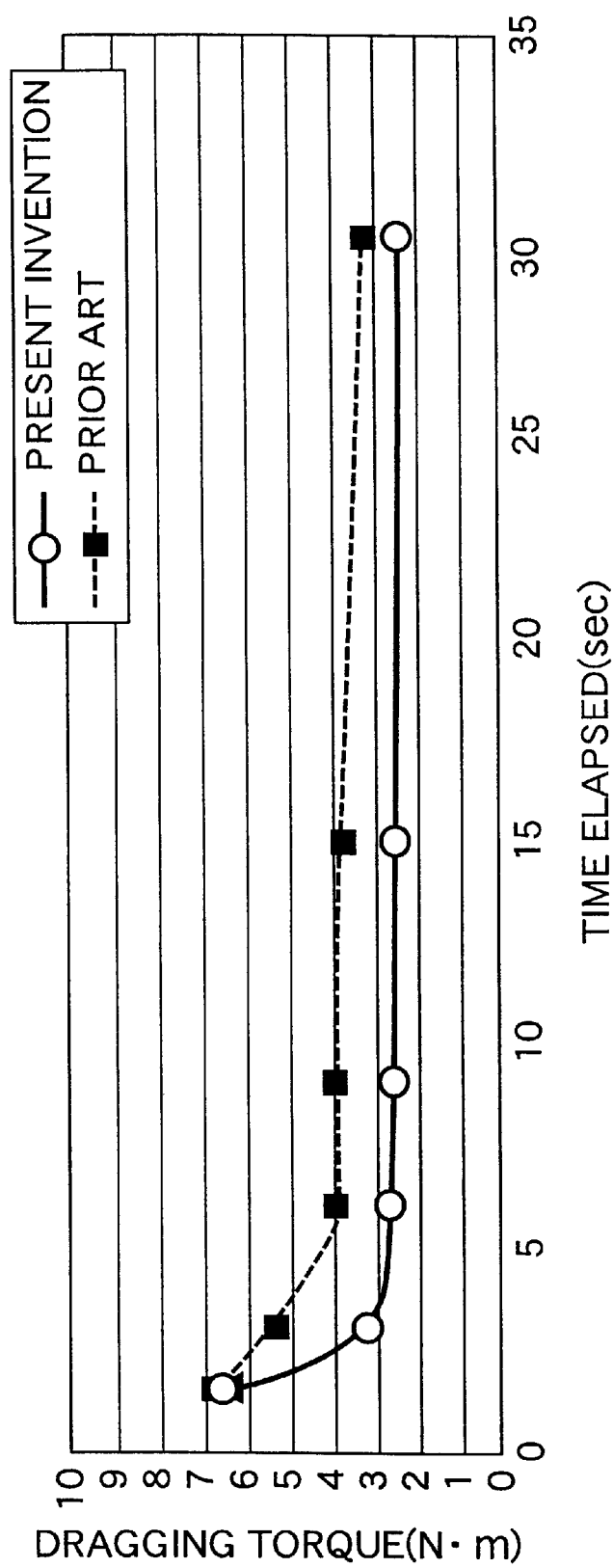
FIG. 7 is a diagram showing the comparison of dragging torques in the clutch using the friction plate according to the embodiments of the present invention and a clutch using a conventional friction plate.
Figure 8:
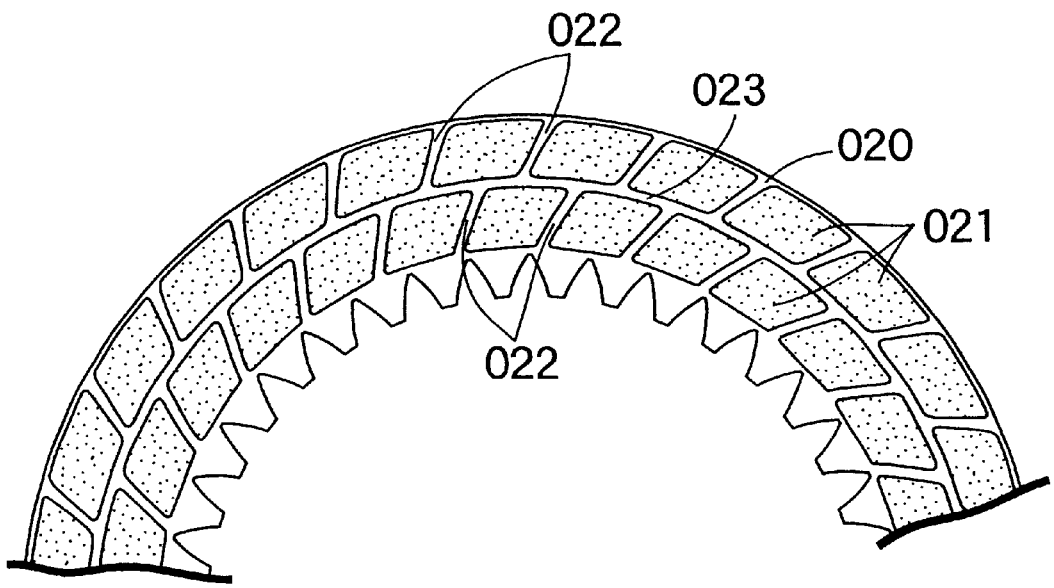
FIG. 8 is a plan view of a conventional friction plate for a wet clutch.

A test for the dragging torque in the clutch C using the friction plates 15 according to the present invention and in the clutch using the conventional friction plates shown in FIG. 7 was carried out in the following manner, thereby providing results as shown in FIG. 7.

(Test Process)

The clutch C and the oil were cooled to a predetermined test-starting temperature (in a range of 10 to 15° C.). Then, the clutch C was once brought into the clutch-ON state and then brought into the clutch-OFF state. Subsequently, in the clutch-OFF state, the output shaft 6 is fixed, and at the same time, the input shaft 5 is rotated from 0 to 1,500 rpm/min for 30 seconds, and a dragging torque produced for such time was measured.

(Test Conditions)

Size of the friction member 21 (outside diameter×inner diameter): 110×82.5 mm Number of the friction plate 15 used : 3

Number of the clutch plate 14 used : 3

Amount of oil supplied to the clutch C : 300 cc/min

As apparent from the test results shown in FIG. 7, it was confirmed that the dragging torque in the clutch C using the friction plates 15 according to the present invention was decreased remarkably, as compared with the clutch using the conventional friction plates, and a good clutch-OFF state was obtained.

Figure 3A:
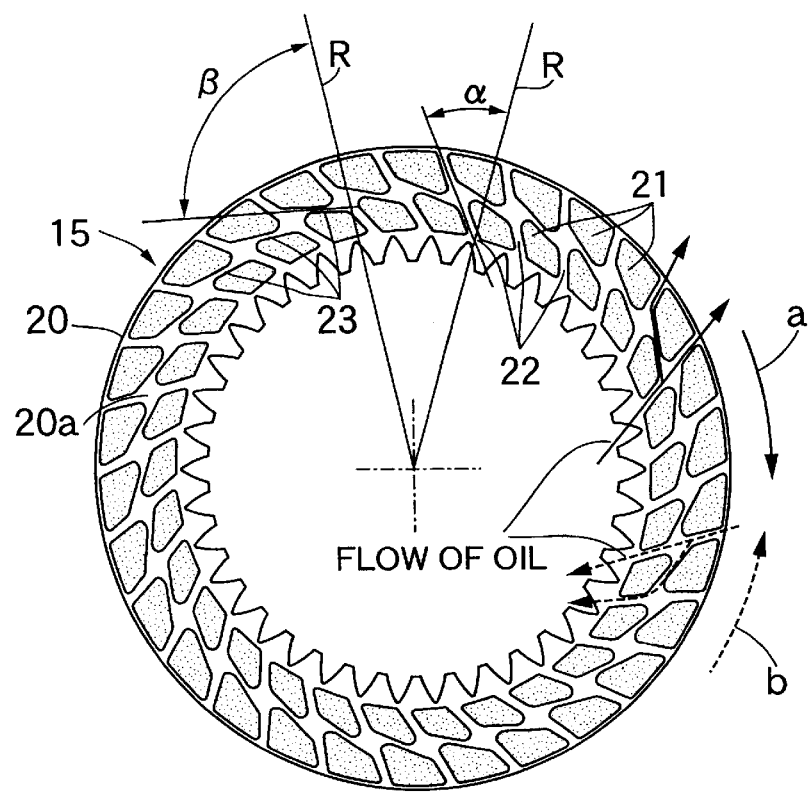
FIG. 3A is a view of one side of a friction plate according to a second embodiment of the present invention.
Figure 3B:
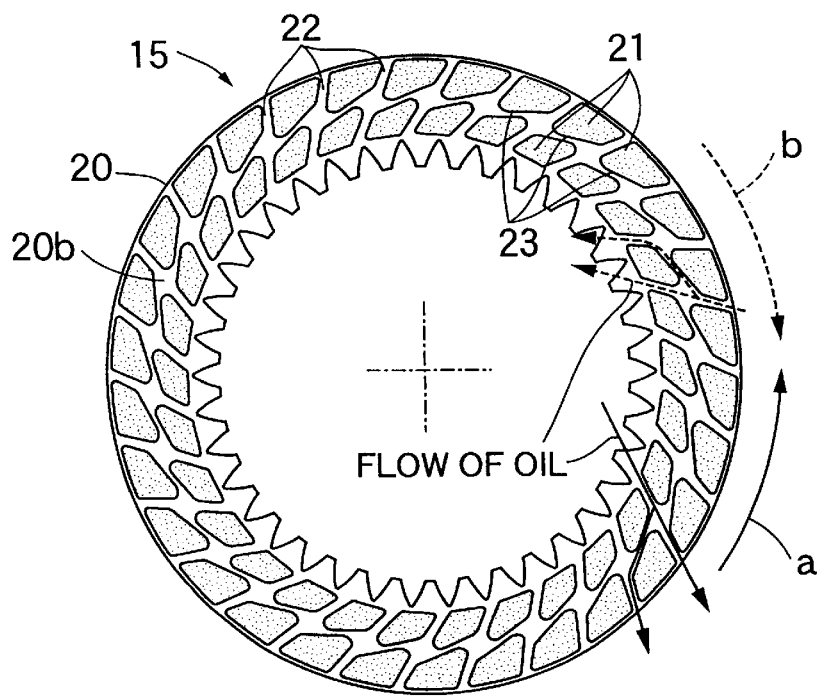
FIG. 3B is a view of the other side of the friction plate.

A second embodiment of the present invention shown in FIGS. 3A and 3B will be described below.

In the second embodiment, directions of inclination of first and second oil grooves 22 and 23 in each of friction members 21 on one side 20*a* and the other side 20*b* of the plate core 20 with respect to the line R of radius are set as the same direction with respect to the rotational direction a or b, and the other arrangement is similar to that in the previous embodiment. Therefore, portions or components corresponding to those in the first embodiment are designated by like reference characters in FIGS. 3A and 3B, and the description of them is omitted.

Figure 4:
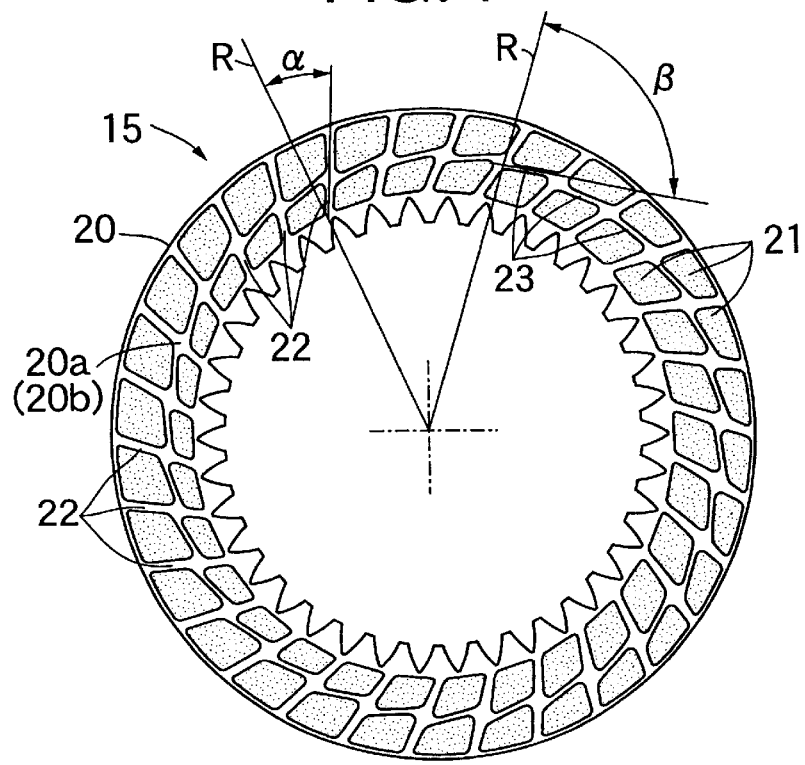
FIG. 4 is a side view of a friction plate according to a third embodiment of the present invention.

A third embodiment of the present invention shown in FIG. 4 will be described below.

In the third embodiment, a group of second oil grooves 23 in friction members 21 are arranged in an annular shape eccentric to the core plate 20, and the other arrangement is similar to that in the first embodiment. Therefore, portions or components corresponding to those in the first embodiment are designated by like reference characters in FIG. 4, and the description of them is omitted.

Figure 5:
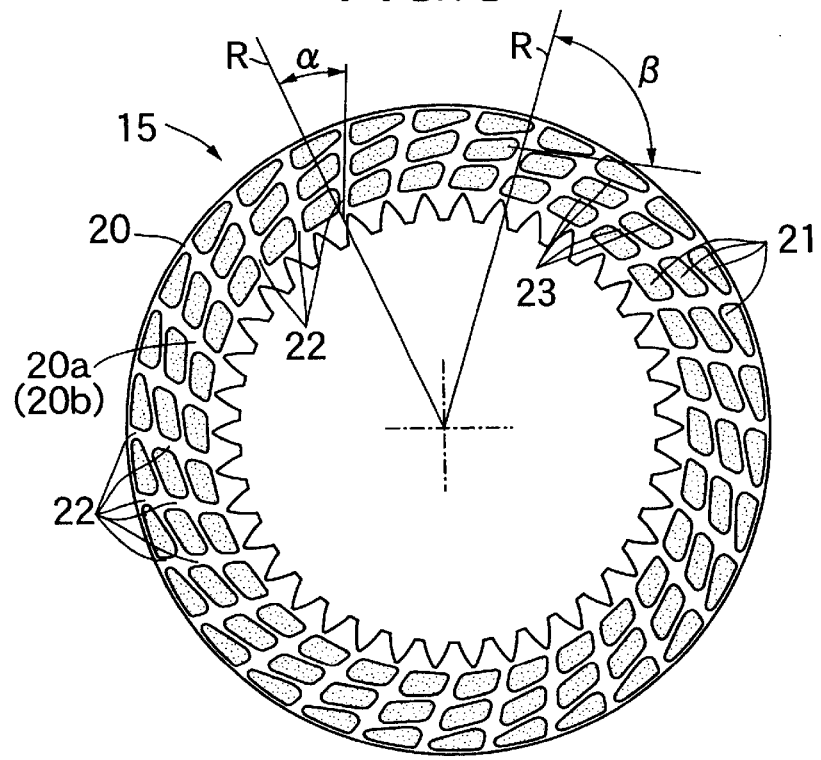
FIG. 5 is a side view of a friction plate according to a fourth embodiment of the present invention.

A fourth embodiment of the present invention shown in FIG. 5 will be described below.

In the fourth embodiment, intermediate portions of adjacent first oil grooves 22 are in communication with each other through a pair of second oil grooves 23 arranged in radially of the core plate 20, and the other arrangement is similar to that in the first embodiment. Therefore, portions or components corresponding to those in the first embodiment are designated by like reference characters in FIG. 5, and the description of them is omitted.

Figure 6:
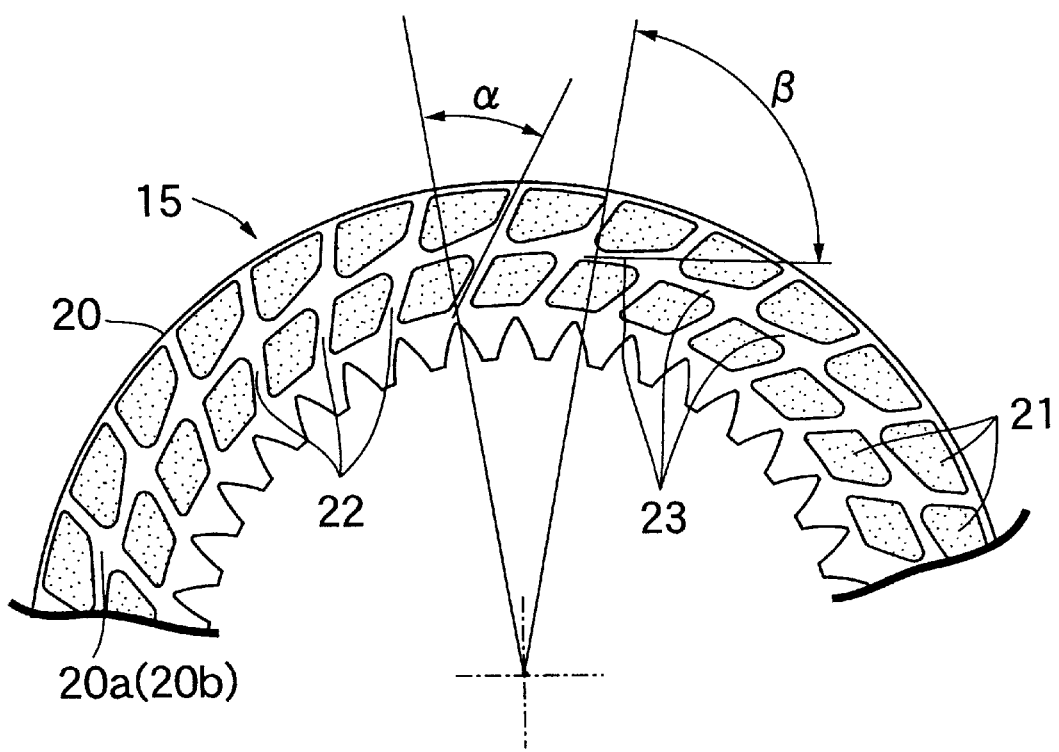
FIG. 6 is a side view of a friction plate according to a fifth embodiment of the present invention.

Finally, a fifth embodiment of the present invention shown in FIG. 6 will be described below.

In the fifth embodiment, each of the second oil grooves 23 is formed, so that its width of the groove is increased toward one end (toward a radially outer end in the illustrated example), and the other arrangement is similar to that in the first embodiment. Therefore, portions or components corresponding to those in the first embodiment are designated by like reference characters in FIG. 6, and the description of them is omitted.

Although the embodiments of the present invention have been described in detail, it will be understood that the present invention is not limited to the above-described embodiments, and various modifications in design may be made without departing from the spirit and scope of the invention defined in claims. For example, in each of the embodiments, the friction members 21 have been in the form of small block pieces and bonded to the core plate 20 to define the first and second oil grooves 22 and 23. Alternatively, a single annular friction member may be bonded to the core plate 20 and then, first and second oil grooves may be formed in the surface of the friction member by embossing or cutting of such surface.

What is claimed is:

1. A friction plate for a wet clutch, comprising a core plate, and friction members bonded to opposite sides of said core plate, said friction members being provided with a plurality of first oil grooves each permitting the communication between inner and outer circumferential edges of said friction member, and a plurality of second oil grooves each permitting the communication between intermediate portions of adjacent first oil grooves, said first oil grooves being disposed in such a manner that they are inclined at a given angle in a circumferential direction of said core plate with respect to a line of radius passing through a radially inner end of each first oil groove, wherein said second oil grooves are disposed in such a manner that they are inclined in the same direction as said first oil grooves at an acute angle larger than said given angle with respect to a line of radius passing through a radially inner end of each second oil groove.

2. A friction plate for a wet clutch according to claim 1, wherein said first oil grooves are formed rectilinearly from an inner circumferential edge to an outer circumferential edge of said friction member.

3. A friction plate for a wet clutch according to claim 1 or 2, wherein said first and second oil grooves are inclined with respect to said line of radius, with radially outer ends of said first and second oil grooves being turned in a rotational direction of said core plate.

4. A friction plate for a wet clutch according to claim 1 or 2, wherein said first and second oil grooves are inclined with respect to said line of radius, with radially inner ends of said first and second oil grooves being turned in a rotational direction of said core plate.

5. A friction plate for a wet clutch according to claim 1 or 2, wherein each of said second oil grooves is formed to have a width increased toward one end of said second oil groove.

6. A friction plate for a wet clutch according to claim 3, wherein each of said second oil grooves is formed to have a width increased toward one end of said second oil groove.

7. A friction plate for a wet clutch according to claim 4, wherein each of said second oil grooves is formed to have a width increased toward one end of said second oil groove.

\* \* \* \* \*